(12) United States Patent
Detlefs et al.

(10) Patent No.: US 7,606,989 B1
(45) Date of Patent: Oct. 20, 2009

(54) METHOD AND APPARATUS FOR DYNAMICALLY PRE-TENURING OBJECTS IN A GENERATIONAL GARBAGE COLLECTION SYSTEM

(75) Inventors: David L. Detlefs, Westford, MA (US); Antonios Printezis, Burlington, MA (US); Fabio Rojas, Chelsea, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 606 days.

(21) Appl. No.: 11/218,145

(22) Filed: Sep. 1, 2005

(51) Int. Cl.
*G06F 13/00* (2006.01)

(52) U.S. Cl. .................................... 711/159

(58) Field of Classification Search ............... None
See application file for complete search history.

(56) References Cited

U.S. PATENT DOCUMENTS

| | | | |
|---|---|---|---|
| 6,799,191 B2 | 9/2004 | Agesen et al. | |
| 6,839,725 B2 | 1/2005 | Agesen et al. | |
| 6,892,212 B2 | 5/2005 | Shuf et al. | |
| 7,210,122 B2 | 4/2007 | Shuf et al. | |
| 2002/0133533 A1* | 9/2002 | Czajkowski et al. | 709/107 |
| 2004/0088277 A1* | 5/2004 | Garthwaite | 707/1 |
| 2007/0174370 A1 | 7/2007 | Detlefs et al. | |

OTHER PUBLICATIONS

Harris, T. L., "Dynamic Adaptive Pre-Tenuring", Proceedings of the International Symposium on Memory Management, Oct. 15-16, 2000, 10 pages.
Jump, M., Blackburn, S. M., and McKinley, K. S., "Dynamic Object Sampling for Pretenuring", ISMM '04, Oct. 24-25, 2004, Vancouver, British Columbia, Canada, 11 pages.
Blackburn, S. M., et al., "Pretenuring for Java", OOPSLA '01, Tampa, Florida, Oct. 14-18, 2001, 11 pages.
Guyer, S. Z. and McKinley, K. S., "Finding Your Cronies: Static Analysis for Dynamic Object Colocation", OOPSLA '04 Vancouver, British Columbia, Canada, Oct. 24-28, 2004, 12 pages.
Hirzel, M., et al., "Understanding the Connectivity of Heap Objects", ISMM '02, Berlin, Germany, Jun. 20-21, 2002, 14 pages.
Jones, R. and Lins R., "Garbage Collection: Algorithms for Automatic Dynamic Memory Management", pp. 155-161, John Wiley & Sons Ltd., Chichester, England, Feb. 1996, 7 pages.

* cited by examiner

*Primary Examiner*—Reginald G Bragdon
*Assistant Examiner*—Eric Loonan
(74) *Attorney, Agent, or Firm*—Osha • Liang LLP

(57) ABSTRACT

In a generational garbage collector, a decision is made to pre-tenure, or allocate new objects directly in the old generation, by a two step process. In the first step, during a young-generation collection, the number of bytes that survive collection is determined for each allocation site and a predetermined number of sites with the highest number of surviving bytes are selected as candidate sites. In the second step, during a subsequent young-generation collection, the survival rates are determined for the candidate sites and objects to be allocated from sites with a sufficiently high survival rate are allocated directly in older generations.

39 Claims, 11 Drawing Sheets

METHOD AND APPARATUS FOR DYNAMICALLY PRE-TENURING OBJECTS IN A GENERATIONAL GARBAGE COLLECTION SYSTEM

CROSS-REFERENCE TO RELATED APPLICATIONS

This application is related to U.S. application Ser. No. 11/340,940, filed on Jan. 27, 2006, entitled "Method and Apparatus for Reducing Object Pre-Tenuring Overhead in a Generational Garbage Collector".

BACKGROUND

This invention relates to automatic reclamation of allocated, but unused memory, or garbage, in a computer system that uses a generational garbage collector and, particularly, to techniques for selectively allocating objects in younger or older generations used by the garbage collector. Memory reclamation may be carried out by a special-purpose garbage collection algorithm that locates and reclaims memory that is unused, but has not been explicitly de-allocated. There are many known garbage collection algorithms, including reference counting, mark-sweep, mark-compact and generational garbage collection algorithms. These, and other garbage collection techniques, are described in detail in a book entitled "Garbage Collection, Algorithms for Automatic Dynamic Memory Management" by Richard Jones and Raphael Lins, John Wiley & Sons, 1996.

However, many of the aforementioned garbage collection techniques often lead to long and unpredictable delays because normal processing must be suspended during the garbage collection process (called "stop the world" or STW processing) and these collectors at least occasionally scan the entire heap. The garbage collection process is performed by collection threads that perform collection work when all other threads are stopped. Therefore, they are generally not suitable in situations, such as real-time or interactive systems, where non-disruptive behavior is of greatest importance.

Conventional generational collection techniques alleviate these delays somewhat by concentrating collection efforts on a small memory area, called the "young" generation, in which most of the object allocation activity occurs. Since many objects allocated in the younger generation do not survive to the next collection, they do not significantly contribute to the collection delay. In addition, the more frequent collection of the young generation reduces the need for collecting the remaining large memory area, called the "old" or "mature" generation and, thus, reduces the overall time consumed during garbage collection.

"Pre-tenuring" is a technique that increases the efficiency of generational garbage collection by identifying object allocations likely to produce objects with longer-than-average lifetimes, and allocating such objects directly in the old generation. This selective allocation fills the young generation with objects with shorter-than-average lifetimes, decreasing their survival rates and increasing the efficiency of collection.

A key issue in pre-tenuring is identifying the object allocations to be allocated in the old generation. One approach is offline profiling in which program training runs are conducted with selected data in order to predict the behavior of subsequent "real" program runs. This approach has the advantage of allowing relatively extensive program "instrumentation" to aid in the prediction, but requires that the user perform extra work, and that the training runs accurately predict the behavior of subsequent "real" runs.

Another approach is static analysis conducted during compilation, such as just-in-time compilation. This static analysis examines object allocation "sites" or instructions that allocate new objects. For example, it has been proposed that an allocation of an object from an allocation site followed by an assignment of that object to a static variable, leads to the conclusion that an object allocated from that allocation site is a good candidate for pre-tenuring. See, for example, "Understanding the Connectivity of Heap Objects", M. Hirzel, J. Henkel, A. Diwan and M. Hind, *Proceedings of the Third International Symposium on Memory Management*, June 2002. Another technique combines static analysis with dynamic techniques to allocate an object in the same generation as an existing object into which a reference to the newly allocated object is assigned. See "Finding Your Cronies: Static Analysis for Dynamic Object Colocation", S. Guyer and K. McKinley, *ACM Conference on Object-Oriented Systems, Languages and Applications*, 2004

Still another approach is to perform profiling used to make pre-tenuring decisions dynamically on the running program. This approach requires no extra effort on the part of users, and the training program run is the real program run, but the cost of the profiling must be very small, or else it will outweigh any efficiency advantages that might be gained. Therefore, techniques using this approach generally use some form of sampling, in which the lifetimes of only a subset of allocated objects are tracked. If this subset is large enough, it will gather enough information to permit accurate pre-tenuring decisions. But the subset cannot be too large, or else the expense of tracking the sampled objects will be too high. Examples of conventional sampling techniques are disclosed in "Dynamic Adaptive Pre-Tenuring", T. Harris, *Proceedings of the Second International Symposium on Memory Management*, October, 2000 and "Dynamic Object Sampling for Pre-tenuring", M. Jump, S. M. Blackburn, and K. S. McKinley, *ACM International Symposium on Memory Management*, October 2004. Rather than sampling all allocations directly, both of these techniques use an event, such as the allocation of a new local allocation buffer, to identify an allocation to be sampled.

However, these conventional sampling techniques are vulnerable to "sampling bias." In particular, the allocations of larger objects often cause a local allocation buffer to overflow and, thus, require a new local allocation buffer to be allocated. Therefore, techniques that sample objects based on their allocation from new local allocation buffers tend to sample larger objects.

SUMMARY OF THE INVENTION

In accordance with the principles of the present invention, a pre-tenuring decision is made by a two step process. In the first step, during a young-generation collection, the number of bytes that survive collection is determined for each allocation site and a predetermined number of sites with the highest number of surviving bytes are selected as candidate sites. In the second step, during a subsequent young-generation collection, the survival rates are determined for the candidate sites. After this, objects allocated from sites with sufficiently high survival rates are allocated directly in the old generation.

In one embodiment, the survival rate for a candidate site is determined by counting the bytes allocated by that site between young generation collections and using the number of those bytes that survive to determine the survival rate.

In still another embodiment, the bytes allocated by a site are counted by bytes allocated counting code that is generated when the allocation code is compiled for that site.

In still another embodiment, the bytes allocated counting code is bypassed when it is generated by the compiler and re-enabled only when the site is selected as a candidate site.

In yet another embodiment, the bytes allocated count that caused a site to be placed in a state in which it is not considered further for pre-tenuring is stored. If the survival rate of that site later increases, and the number of surviving bytes for that site becomes sufficiently large, that site is then reconsidered as a candidate site.

In still another embodiment, pre-tenuring decisions are reversed at regular intervals, changing the state of pre-tenured sites back to normal sites or perhaps directly to candidate sites.

In yet another embodiment where it is possible to distinguish between pre-tenured allocation and normal promotion allocation in the old generation, when the old-generation occupancy that will cause the old generation to be collected is approached, allocation counting for some set of pre-tenured allocation sites is re-enabled. After old generation "liveness" is determined, the surviving bytes are counted for each allocation site that is being sampling, in order to obtain a survival rate estimate.

In a further embodiment, surviving objects are counted by allocation in a young-generation-sized area of the old-generation that is being filled by allocation from pre-tenured objects. Instead of enabling counting when this area is filled however, this embodiment estimates the expected bytes surviving from the allocation and survival rates computed when the site was a candidate site and reverses the pre-tenuring decision if the actual amount surviving for a site is sufficiently smaller than the estimate.

DETAILED DESCRIPTION

Figure 1:
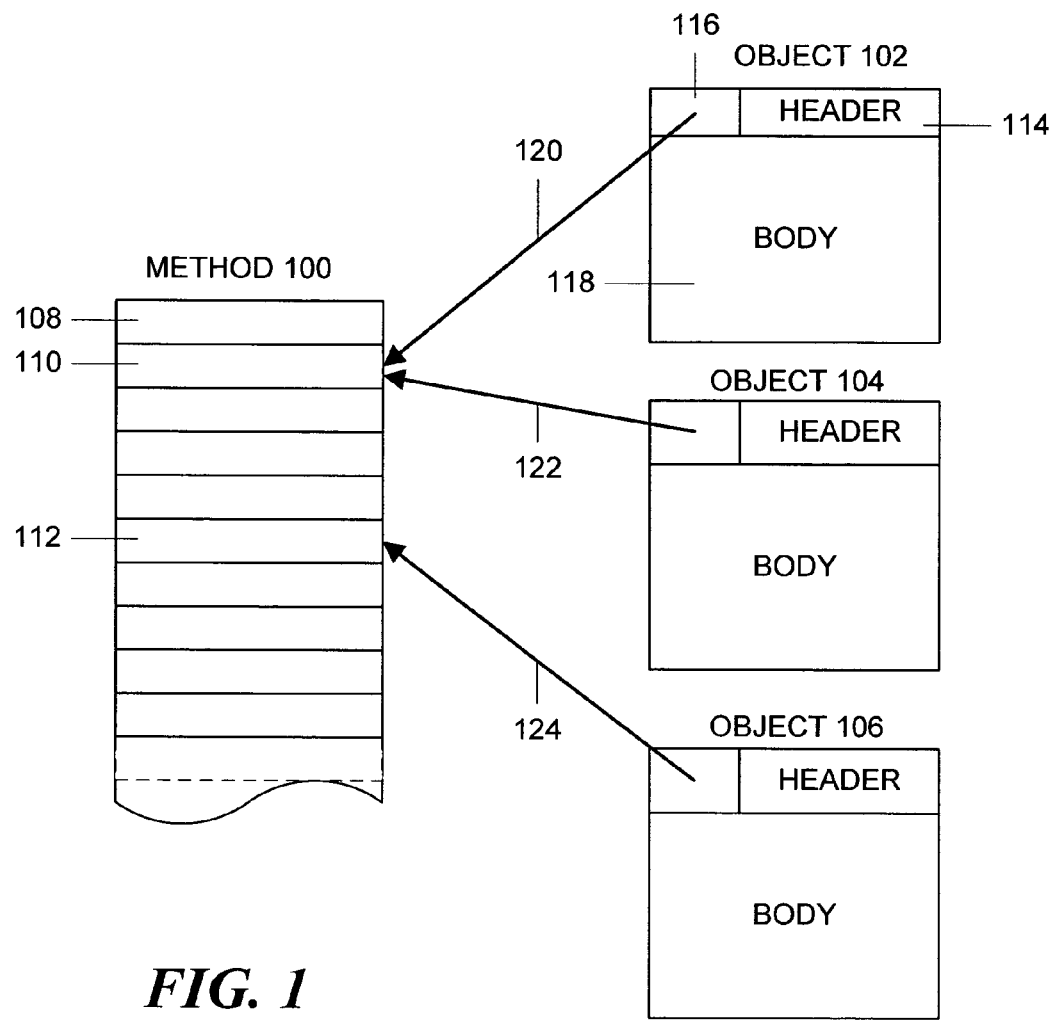
FIG. 1 is a block schematic diagram illustrating the insertion of a per class allocation site identifier into an object header.

In accordance with the principles of the invention, allocation code that is generated by a compiler is modified to implement a pre-tenuring process. In order to do this an assumption is made that each allocated object has a prefix called a "header" as well as a "body". This arrangement is illustrated in FIG. 1 in which object 102 has a header area 114 and a body 118. Typically, one portion of header area 114 is used to indicate the class of the object 102; the remainder of header area 114 may be used to record information on other object attributes, such as locking, hash codes, and the like.

In order to implement the invention, some portion of header 114 must be dedicated to recording an identifier for each allocation site that allocated the object. Since the header 114 typically includes class information, these identifiers need only be unique per class. This arrangement is illustrated in FIG. 1 in which object 102 could be allocated from a site in method 100. Method 100 is comprised of sets of instructions that are schematically illustrated as instructions 108, 110 and 112. For example, if object 102 was allocated by an instruction or set of instructions 110 in method 100, then a per-class identifier 116 is inserted into header 114 of object 102. Per class identifier 116 identifies the site 110 that allocated the object 102 as schematically illustrated by arrow 120. Another object 104 might be allocated by the same allocation site 110 in method 100, and the per class identifier in the header of that object 104 would also point to site 110 as schematically illustrated by arrow 122. The per-class identifiers of other objects identify the sites that allocated those objects. For example, if object 106 was allocated from site 112 then its per-class identifier would point to site 112 as schematically illustrated by arrow 124. If a class has more allocation sites than the dedicated portion of the header 114 allows, an overflow value can be used to indicate that the allocation site identifier is stored in a word that follows the object. If this scheme is used, object size calculations must take this overflow word into account.

Figure 2:
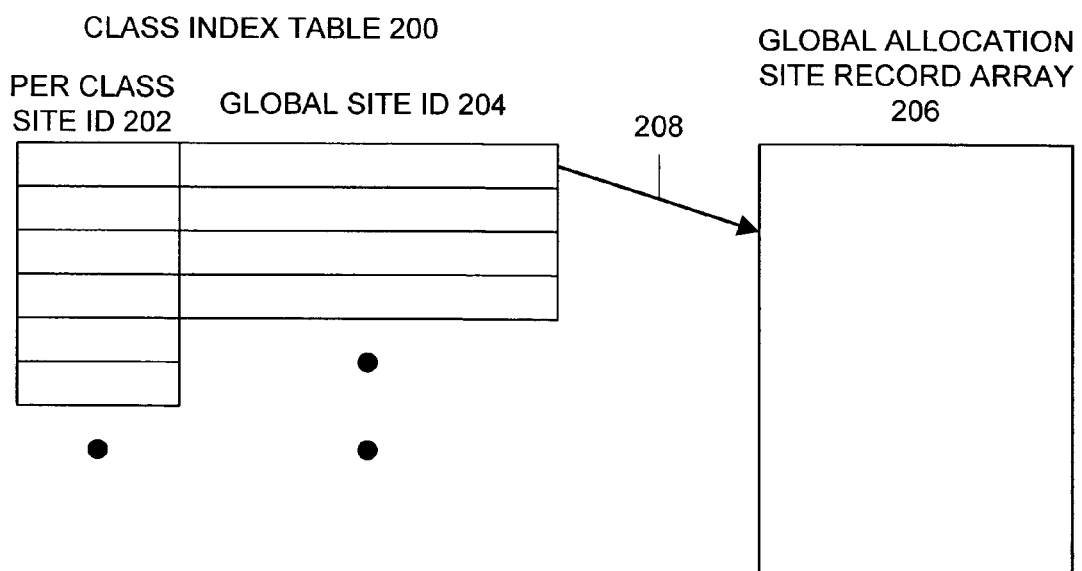
FIG. 2 is a block schematic diagram illustrating a class index table that is used to convert a per class allocation site identifiers into a global site identifier that is, in turn, used to access a global allocation site record array.

Each allocation site is also assigned a global site identifier that is unique even across classes. A class index table is used to map per class site identifiers to the global site identifier as shown in FIG. 2. In FIG. 2, class index table 200 is indexed by per class site ID s 202. Each per class site ID is mapped to a global site ID 204 by table 200. Only allocations from "just-in-time" (JIT) compiled code are tracked. One allocation site identifier (per class and globally) is used to represent allocation from other sources, such as interpreted code, native code, reflection, etc. Each global site ID 204 is used to index into a global allocation site record array 206 as indicated schematically by arrow 208. The global allocation site record array is indexed by global allocation site IDs and tracks bytes allocated and surviving collection at each allocation site as will be discussed below. Array 206 is initialized to zero at the start of the garbage collection process.

Figure 3A:
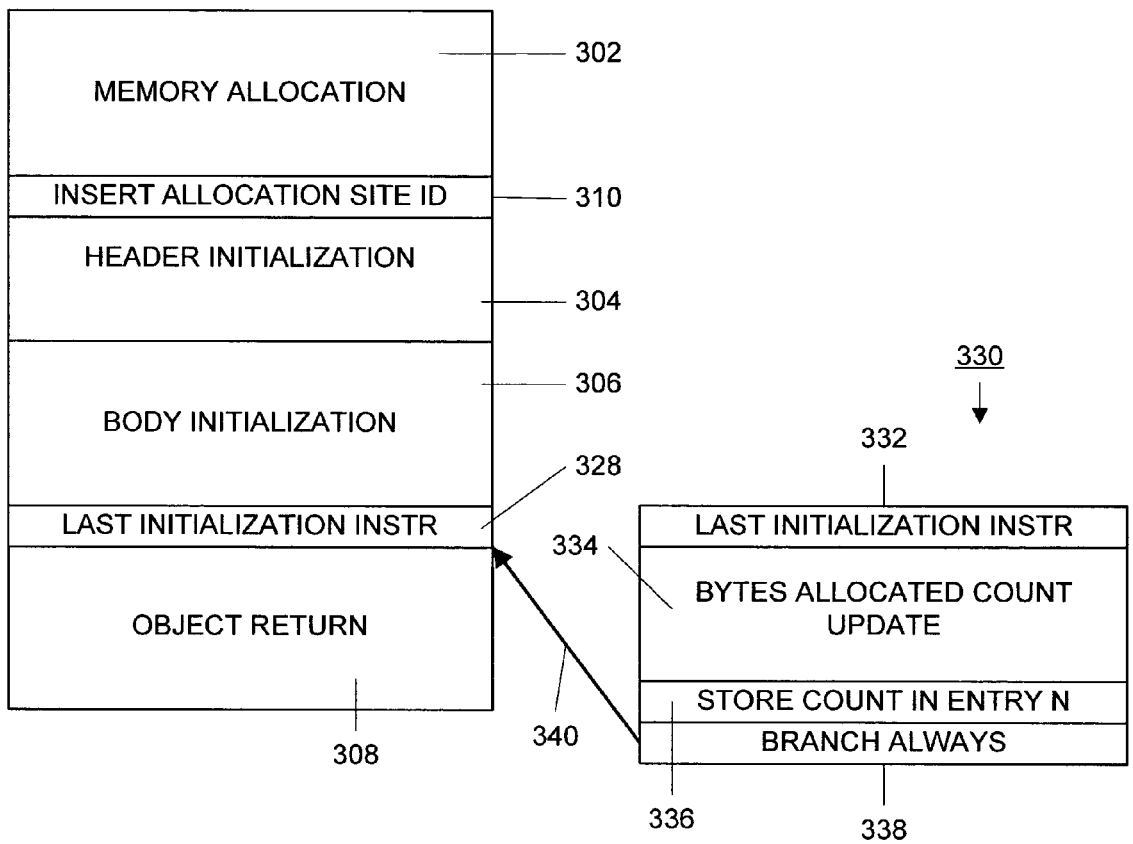
FIG. 3A is a block schematic diagram illustrating modifications that are made to object allocation code to count bytes allocated at a particular allocation site.
Figure 3B:
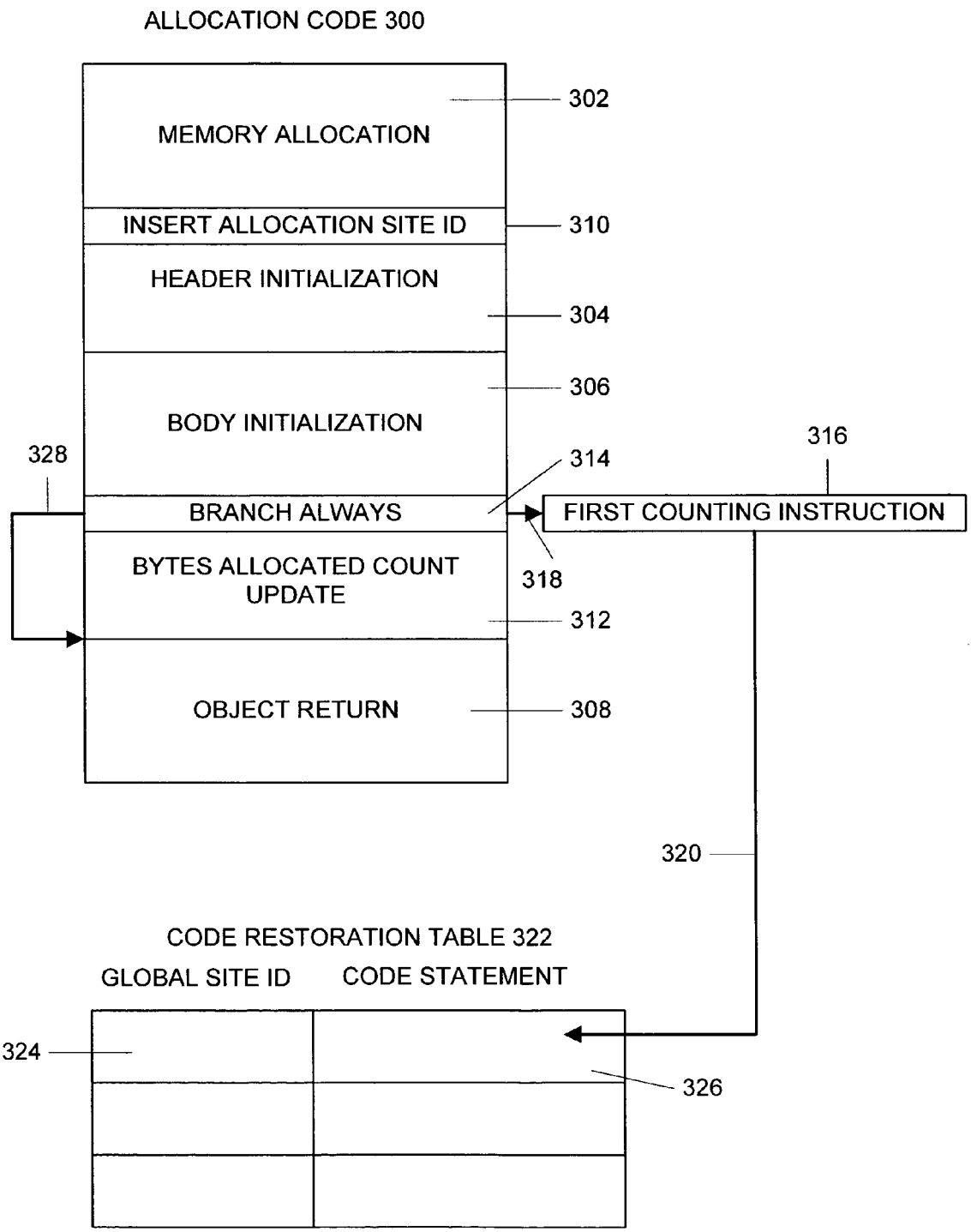
FIG. 3B is a block schematic diagram illustrating alternative modifications that are made to object allocation code to count bytes allocated at a particular allocation site.
Figure 4A:
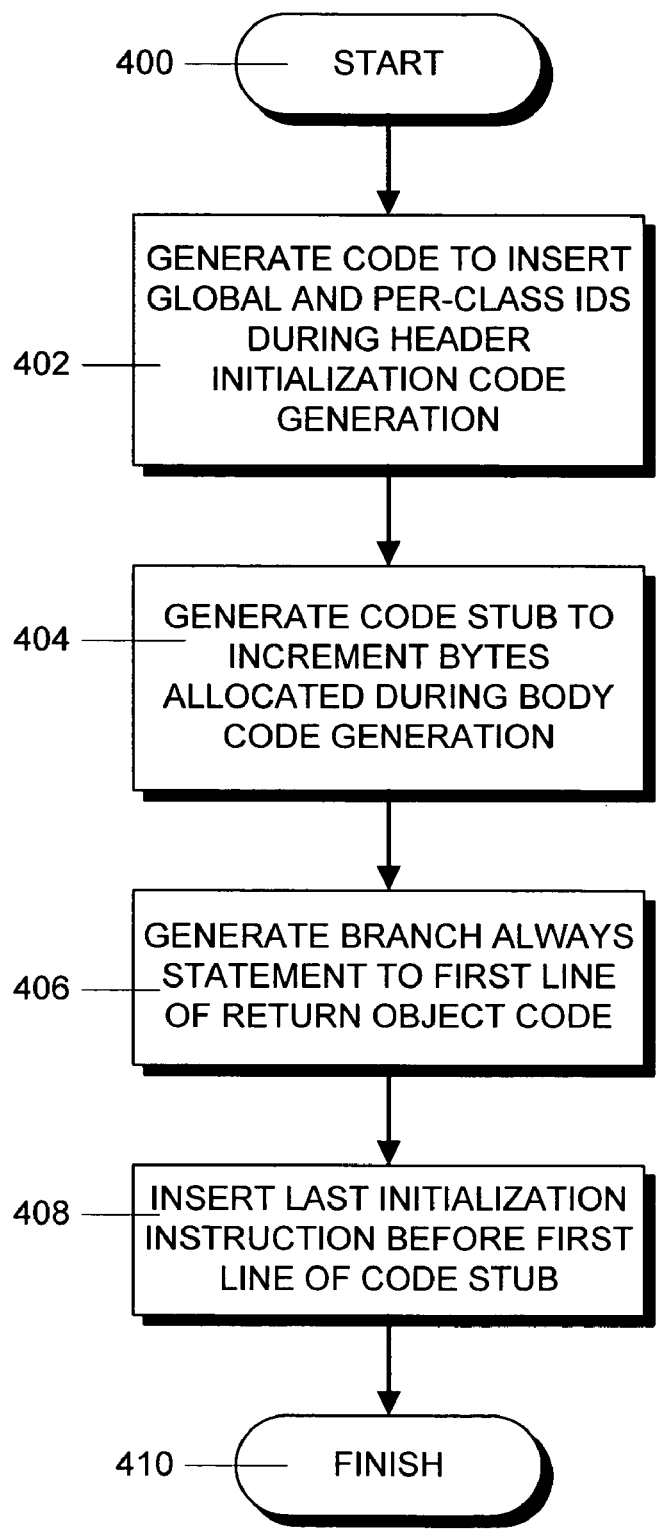
FIG. 4A is a flowchart showing the steps in an illustrative compilation process performed by a compiler to generate object allocation code for a particular allocation site.

When allocation code for an allocation site is JIT-compiled for the first time, it is assigned the aforementioned global and per-class identifiers. Two alternative forms of this code are shown in schematic form in FIGS. 3A and 3B and the processes for generating the code is illustrated in the flowcharts shown in FIGS. 4A and 4B. Referring to FIG. 3A, allocation code 300 generally consists of four sections. These sections include a memory allocation section 302 which allocates memory space for the object, a header initialization section 304 that initializes the object header, a body initialization section 306 that initializes the object body, and an object return section 308 that returns a reference to the completed object to the calling method. The process for generating this code is shown in FIG. 4A and, as modified according to the invention, starts in step 400 and proceeds to step 402 where, in accordance with the principles of the invention, during the generation of the header initialization section 304, additional code 310 is generated which inserts the per class allocation site ID into the object header. Since the object allocation code must initialize the header; adding additional code to insert the per-class allocation site identifier into the object header does not add any appreciable overhead.

In step 404, a code stub 330 is generated containing code that updates the count of the number of bytes allocated at the allocation site identified by the allocation site ID in the object header. The operation of this code is described below. In some platforms care must be taken to ensure that the stub is sufficiently close to the main method body to allow for efficient branching. For example, it may be desirable that the location of the stub be expressible as an immediate constant that can be stored within the branch instruction. After generating this count update code 330, in step 406, a branch always instruction 338 is generated that returns control to the first instruction in the object return portion 308 of the allocation code 300 as schematically illustrated by arrow 340. Finally, in step 408, the last instruction 328 of the object body initialization code 306 is inserted before the first instruction 332 of the code stub 330. The process then finishes in step 410 after generating the object return code 308.

Figure 4B:
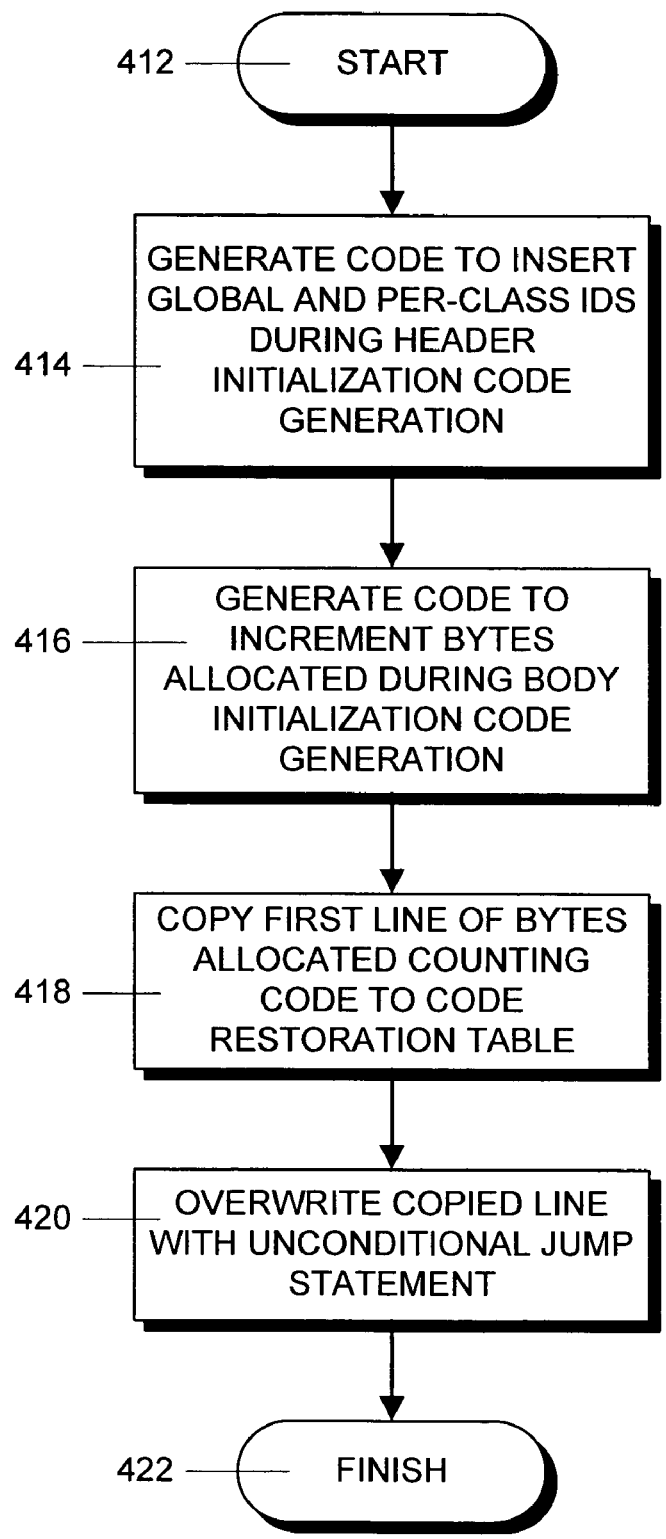
FIG. 4B is a flowchart showing the steps in an alternative illustrative compilation process performed by a compiler to generate object allocation code for a particular allocation site.

Other alternative arrangements exist for implementing the bytes allocated count update code. For example, as illustrated in FIGS. 3B and 4B, the compilation of the allocation code could also be modified to insert the bytes allocated counting code 312 at the end of the body initialization section 306. In FIG. 3B, elements that are the same as elements in FIG. 3A have been given the same numeral designations. This alternative process begins in step 412 and proceeds to step 414 where, as in the previous embodiment and during the generation of the header initialization section 304, additional code 310 is generated which inserts the per class allocation site ID into the object header. The bytes allocated count update code 312 is then generated during the object body initialization code 306 as set forth in step 416. However, after generating this count update code 312, in step 418, the first instruction of this latter code 316 is copied to a code restoration table 322 as indicated schematically by arrow 320. Each entry in the code restoration table 322 is indexed by a global allocation site identifier 324 and contains the code statement 326 that has been copied from the count update code. Then, in step 420, the first count instruction is overwritten with an unconditional branch instruction 314 that causes the program to jump to the instruction after the counter-update code 312 as indicated schematically by arrow 328. Thus, the counting code is normally disabled, and incurs only a small overhead at runtime caused by the branch always instruction 314. The allocation code compilation process then finishes at step 422 after generating the object return code 308.

Figure 5A:
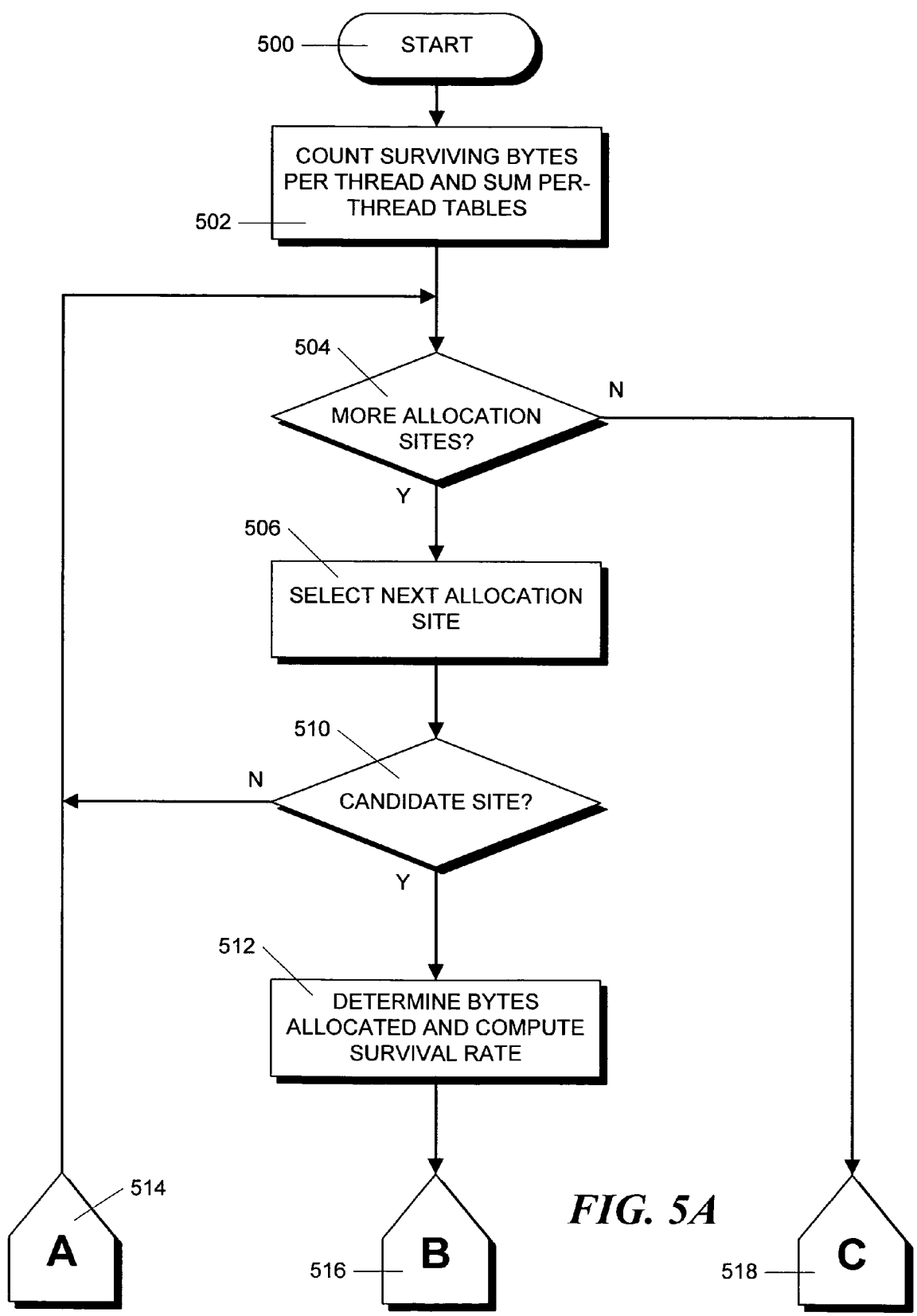
FIGS. 5A and 5B, when placed together, form a flowchart showing the steps in an illustrative runtime process for selecting allocation sites in order to pre-tenure objects allocated from those sites.
Figure 5B:
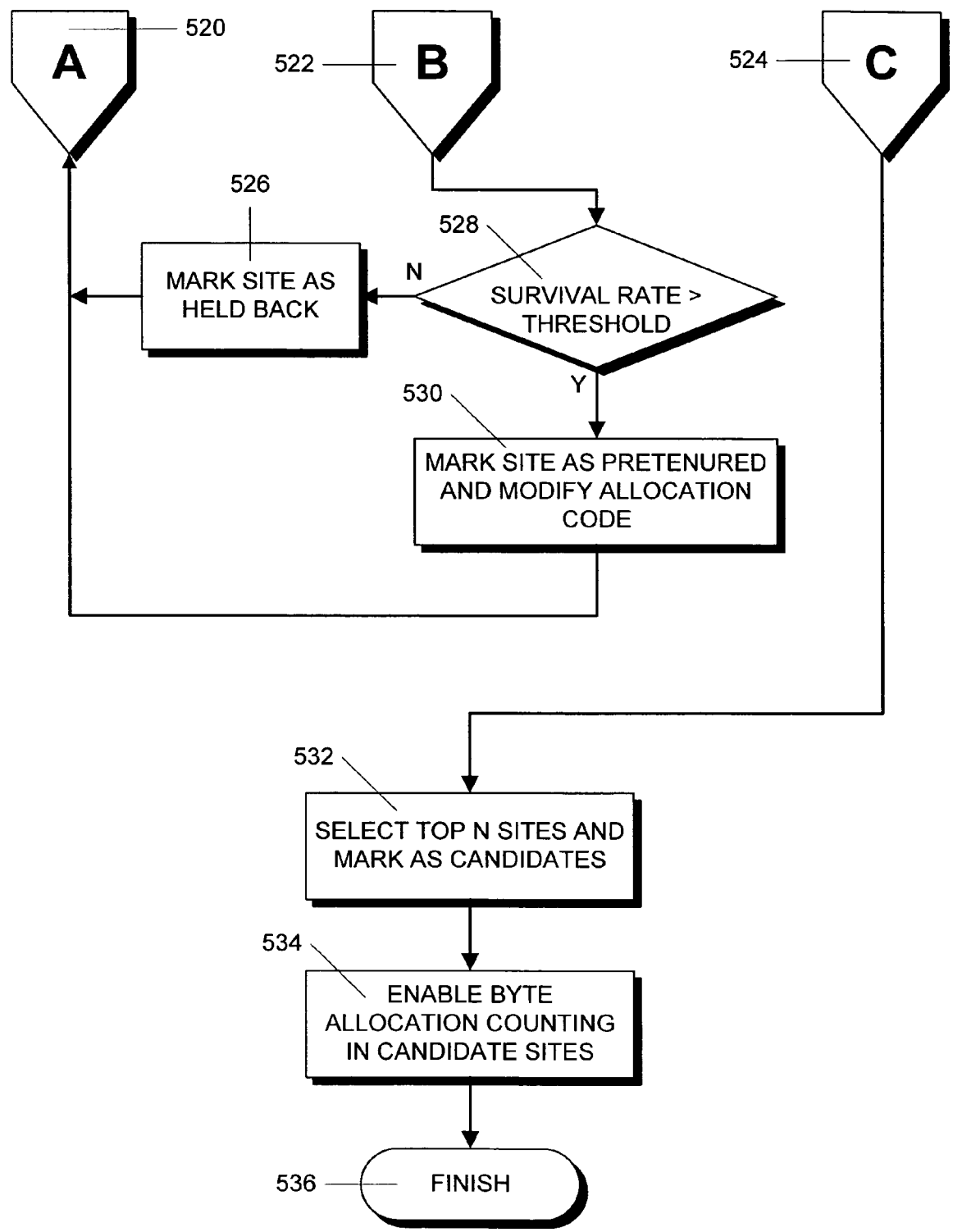

After the allocation code is generated, the operation of the system at runtime is described in connection with FIGS. 5A and 5B, which, when placed together, form a flowchart that shows the steps in an illustrative process for pre-tenuring selected objects. This process begins in step 500 and proceeds to step 502 where, during a young generation collection, the number of bytes allocated at each allocation site that survive collection is counted. In general, this is done by examining each object that survives collection and using the allocation site identifier in the object header to access the class index table 200 to obtain a corresponding global allocation site identifier 204. This global allocation site identifier is then used to access an entry in the global allocation site record array 206. The number of bytes in the object is then added to a surviving byte count in that entry.

Figure 6:
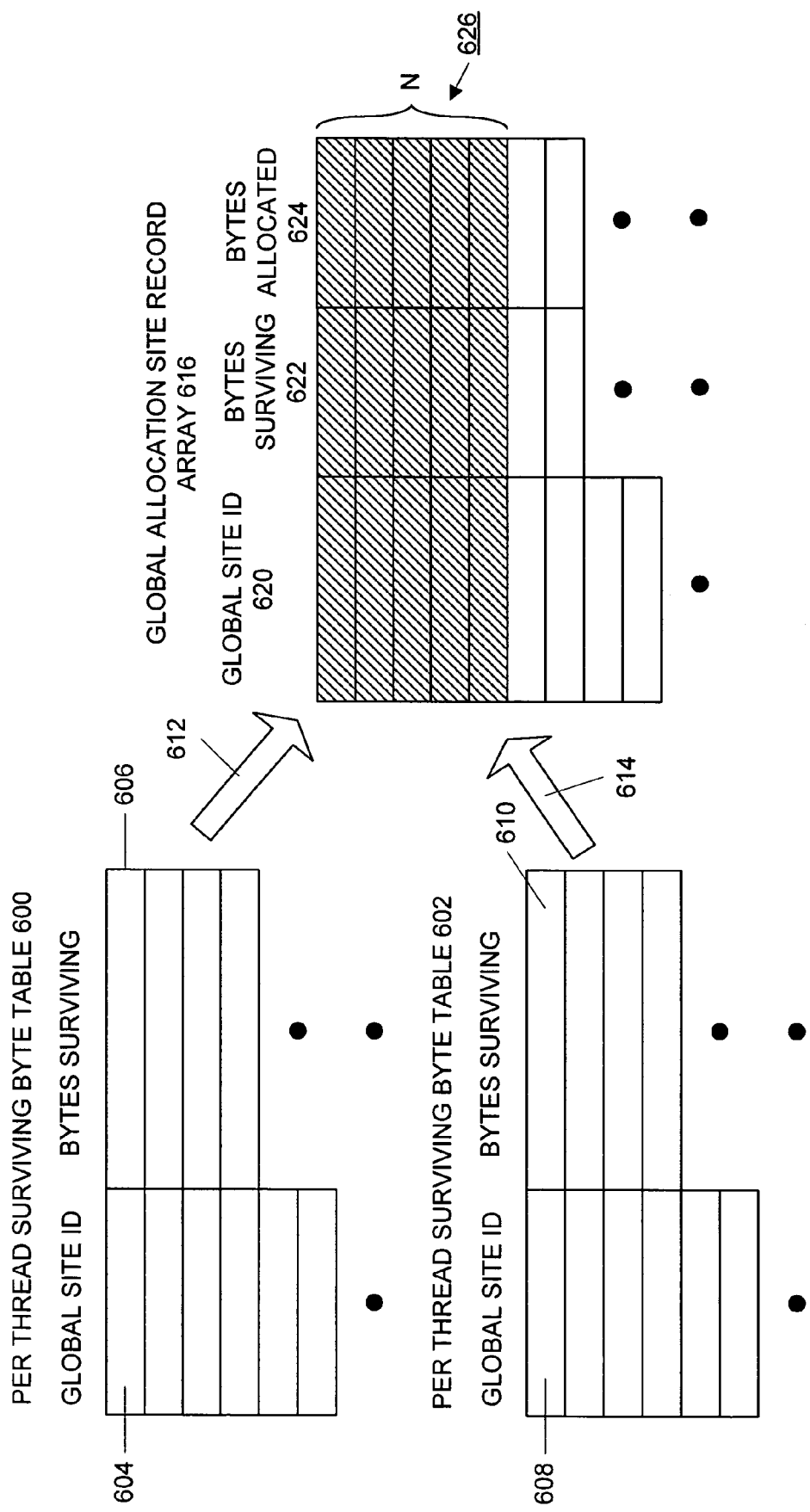
FIG. 6 is a block schematic diagram illustrating the combination of per-thread surviving byte tables into the global allocation site record array.

If garbage collection is being performed by parallel threads, each thread has a private array that maps global allocation site identifiers to a surviving byte count. At the end of the collection cycle, these per-thread tables are summed into the global allocation site record array. This process is illustrated schematically in FIG. 6. As shown, per-thread surviving byte table 600 and per-thread surviving byte table 602 are combined into global allocation site record array 616 as indicated by arrows 612 and 614. In particular, table 600 contains entries, each of which is indexed by a global site identifier 604 and has a count of the bytes surviving 606 for that site. Similarly, table 602 contains entries, each of which is indexed by a global site identifier 608 and has a count of the bytes surviving 610 for that site. Global allocation site record array 616 contains entries 618 each of which is indexed by a global site identifier 620 and has a bytes surviving count 622 and a bytes allocated count 624. When tables 600 and 602 are combined, the bytes surviving counts 606 and 610 are summed into the bytes surviving count 622 for the corresponding global site identifier 620 in table 616. The bytes allocated count is updated as described below.

If only a single thread is performing garbage collection, then global allocation site record array 616 can be updated directly by the thread that increments the bytes surviving count 622 for each site. In either case, after the surviving byte counts for all sites have been updated, the global allocation site record array is sorted in order of the bytes surviving count 622, thereby ranking the allocation sites by the number of surviving bytes.

However, allocation sites that have the highest number of surviving bytes are not necessarily good candidates for pre-tenuring the objects that they allocate. For example, assume that an application performs two young generation collections of a ten megabyte young generation. Between these two young generation collections, the application allocates 9.5 megabytes of objects from a class A and 0.5 megabytes of objects from class B (assume, for simplicity, that objects of each class were allocated at a single allocation site). Assume further that, during each young generation collection, 0.5 megabytes of objects of class A type and 0.4 megabytes of objects of class B type survive to be tenured. While the class A-allocating site has more bytes surviving, its survival rate is only 5.2 percent, while the class B-allocating site has a survival rate of 80 percent. Although the class B-allocating site has less bytes surviving, it actually would be a better pre-tenuring candidate.

Figure 7:
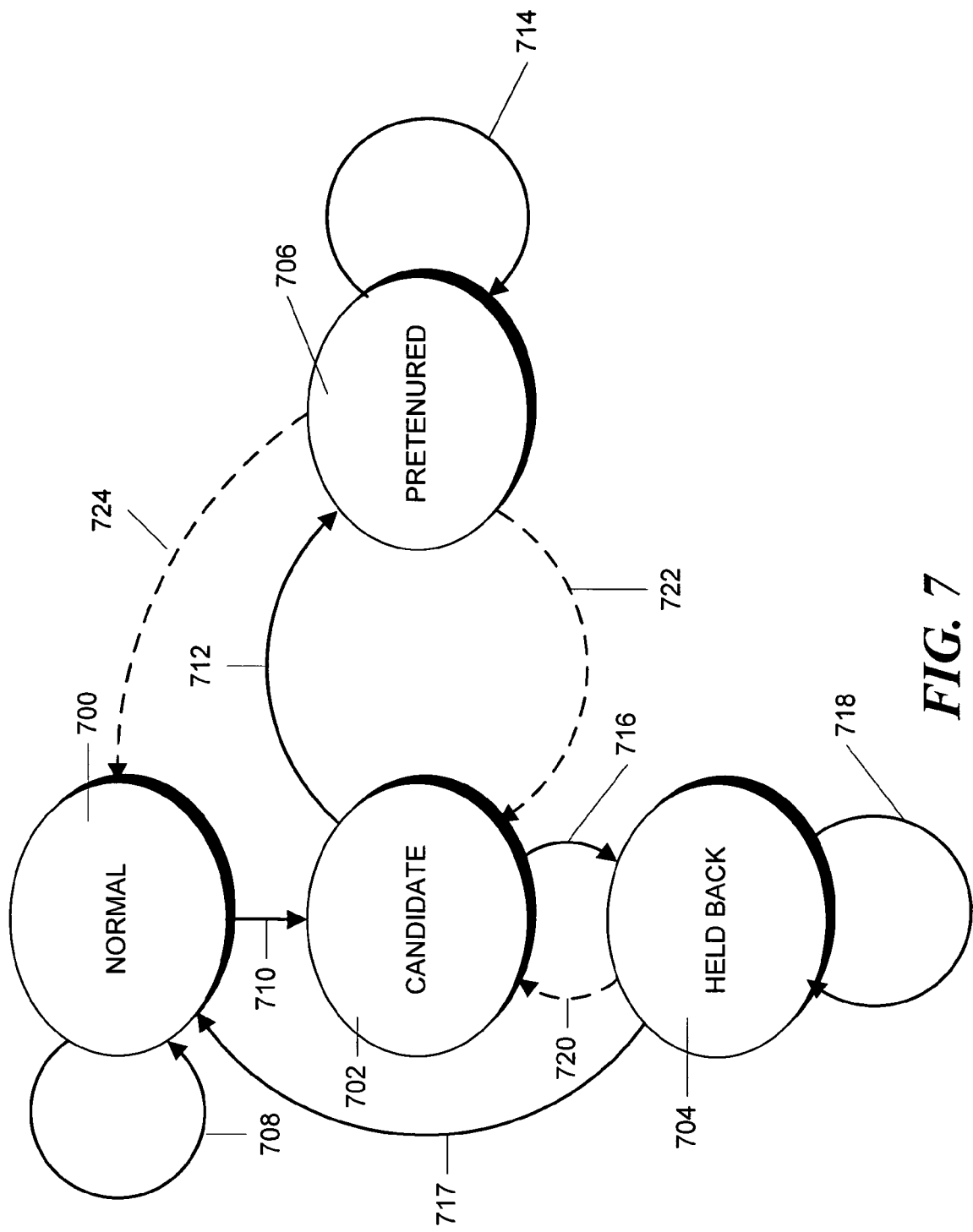
FIG. 7 is a state diagram showing various states in which an allocation site may be resident according to the principles of the invention.

Therefore, ranking high in number of surviving bytes during a collection cycle only qualifies an allocation site as a candidate for possible pre-tenuring. In accordance with the principles of the invention, a further evaluation of each candidate site is performed during subsequent young generation collections by counting bytes allocated by that candidate site between collection cycles in order to select candidate sites for actual pre-tenuring. This gives rise to several states in which an allocation site can exist during various collection cycles. These states are illustrated in the state diagram shown in FIG. 7.

These states include the "Normal" state 700, the "Candidate" state 702, the "Held Back" state 704 and the "Pre-tenured" state 706. When an allocation site is in a "Normal"

state 700, objects are allocated in the heap memory area assigned to the young generation. In this state, the allocation site has not yet been considered as a pre-tenuring candidate. An allocation site may remain in state 700, as indicated schematically by arrow 708, if its surviving bytes do not reach a predetermined level as discussed below.

If the surviving bytes of a site in a "Normal" state 700 reach a predetermined level (which can be either a fixed number of bytes or a percentage of the heap size), then the site can progress to a "Candidate" state 702 as indicated by arrow 710. When a site is in a "Candidate" state 702, its allocated bytes are being counted and it will be further examined to determine how to classify it during a subsequent young-generation collection cycle.

If, in a subsequent collection cycle, the "Candidate" site 702 was found to allocate a sufficiently large fraction of surviving objects, the site can progress to the "Pre-tenured" state 706 as indicated schematically by arrow 712. When a site in the "Pre-tenured" state 706, its allocation code is modified to allocate objects in the heap memory area assigned to the old generation. Once in a "Pre-tenured" state 706, a site may stay in that state indefinitely as indicated by arrow 714.

If, in a subsequent collection cycle, the "Candidate" site 702 was found not to allocate a sufficiently large fraction of surviving objects, the site progresses to the "Held Back" state 704 as indicated by arrow 716. When a site is in the "Held Back" state 704, similar to a site in the "Normal" state 700, its allocation code allocates objects in the heap memory area assigned to the young generation. However, sites in a "Held Back" state are no longer considered as possible candidates for pre-tenuring. Once in a "Held Back" state 704, there are several options. The site may stay in the "Held Back" state 704 for a period of time as indicated by arrow 718 and then return to the normal state 700 as indicated by arrow 717. The period of time can be determined by counting to a predetermined number of young generation collections that have elapsed from the time that the site was designated as "Held Back." The period of time could also be a predetermined time interval that starts from the time that the site was designated as "Held Back." Alternatively, a site may stay in that state indefinitely as indicated by arrow 718.

Returning to FIG. 5, after the surviving bytes for each allocation site have been counted, the sites are examined to determine the disposition of sites that have been placed in the "Candidate" state during previous collection cycles. In particular, in step 504, a determination is made whether additional allocation sites remain to be examined. If no additional sites remain to be examined, the process proceeds, via off-page connectors 518 and 524 to step 532 where the sites are examined to determine whether any sites in a "Normal" state should progress to the "Candidate" state.

Candidate sites are then selected by choosing a predetermined number (N) of the top ranking entries (excluding sites that are in a "Held Back" state, are already in a "Candidate" state or are in a "Pre-tenured" state) to place in a "Candidate" state as indicated in step 532. The bytes allocated at these candidate sites are then monitored between collection cycles. This monitoring is performed by enabling byte allocation counting at each candidate site as set forth in step 534. Byte allocation counting is enabled at each candidate site depending on the method used to implement the byte counting code. If a code stub is used as set forth in FIG. 3A, then the last initialization instruction 328 in the body initialization section 306 is overwritten with a branch always instruction that causes an unconditional jump to the last initialization instruction 332 in the code stub 330. The code stub 330 then executes and the branch always instruction 338 returns control to the object return code 308.

Alternatively, if the byte counting code is in-line, but bypassed as shown in FIG. 3B, then the counting code is activated by accessing the code restoration table 322 using the global allocation site identifier for that site and retrieving the code statement stored there previously during compilation. The retrieved code statement is then used to overwrite the unconditional branch statement placed at the start of the bytes allocated count update code during compilation.

At runtime, the bytes allocated count update code for each candidate site uses the global allocation site identifier for that site to access the global allocation site record array and add the number of bytes allocated to the bytes allocated count 624 for that site. The process then finishes in step 536.

Returning to FIG. 5, if, in step 504, additional sites remain to be examined in order to process sites in a "Candidate" state, the process proceeds to step 510, where a determination is made whether the selected site is in a "Candidate" state. If not, the process proceeds back to steps 504 and 506 to select another site for examination.

However, if, in step 510, it is determined that the selected site is in a "Candidate" state, then the process proceeds to step 512 to examine the site to decide whether the site should be placed in a "Pre-tenured" state or a "Held Back" state. In particular, in step 512, the number of bytes allocated by the site from the time that the site was placed in the "Candidate" state until the present time is determined. Note that the bytes allocated for a site in the "Candidate" state may be examined on the young generation collection immediately following the young generation collection during which the site entered the "Candidate" state or the bytes allocated at a site in the "Candidate" state may be summed over a predetermined number of young generation collections before the sum of the bytes allocated is examined (of course, the bytes surviving in that predetermined number of young generation collections must also be summed to determine an accurate survival rate.) In step 512, the number of bytes allocated by a candidate site is determined by using the global allocation site identifier for that site to access the global allocation site record array and retrieve the bytes allocated count for the site. The survival rate for each candidate site is then calculated by dividing the bytes surviving by the bytes allocated.

The process then proceeds, via off-page connectors 516 and 522, to step 528 where a determination is made whether the calculated survival rate is greater than a predetermined threshold. Candidate sites whose survival rates exceed this threshold are placed in a "Pre-tenured" state as set forth in step 530. Placing a site in a "Pre-tenured" state involves marking the site as being in the "Pre-tenured" state and changing the memory allocation code generated for the allocation site to allocate memory space directly in heap memory area assigned to the old generation, rather than in the heap memory area assigned to the young generation. If care is taken with the code generation, the change in memory areas can be done simply by modifying immediate constants in the originally-generated instructions.

When a site is placed in the "pre-tenured state", the bytes allocated counting code can also be disabled in order to increase the overall efficiency of the code. If the bytes allocated code is in the form of a code stub 330, as shown in FIG. 3A, then the branch always instruction that causes a jump to the stub is overwritten by the last initialization instruction 332 found at the beginning of the stub 330. Alternatively, if the bytes allocated code is in-line, then it can be bypassed by overwriting the first counting instruction with a branch always instruction.

If, in step 528, it is determined that the survival rate for the site in the "Candidate" state is less than the predetermined threshold, the site is marked to place it in a "Held Back" state in step 526. As previously mentioned, sites in a "Held Back" state are not considered for future progression to the "Candidate" state. It is also possible to use a second lower threshold to determine which sites should be placed in the "Held Back" state. In this case, "intermediate" sites with survival rates between the two thresholds could be monitored for a while before making a decision in order to increase the confidence of the decision. As described above, the bytes allocated counting code can also be disabled to prevent it from slowing the overall operation of the application.

From either step 530 or 526, the process proceeds, via off-page connectors 520 and 514, back to step 504 to determine whether further sites remain to be examined.

The aforementioned process enables counting of bytes allocated at allocation sites in the "Candidate" state between two young generation collections using a global allocation site record array 616 that maps global allocation site identifiers to array records of which one field is used to record a count of allocated bytes for an allocation site. Code can easily be generated to increment the allocated bytes field of an entry in such an array by the size of an allocated object if a single-threaded programming language is used. However, in a multi-threaded environment, such incrementing code becomes more difficult to generate and runs slower. For example, the array entry can be locked during the incrementing operation or atomic instructions such as fetch-and-add or compare-and-swap can be used to store the results of the increment, but these alternatives can slow the operation of the program considerably, especially if an allocation site is popular and their use causes contention. Even if atomic techniques are not used, thereby allowing some increments to be lost in the case of a conflict, cache memory line contention still may have deleterious effects on performance.

One way to avoid the performance penalties introduced by atomic operations is to maintain a matrix mapping pairs of global allocation site identifiers and thread IDs to allocated byte counts. However, such matrices could consume significant memory space, since the number of application threads may be large. Further, the expense of summing the per-thread matrix entries at the next collection can also be significant.

Figure 8:
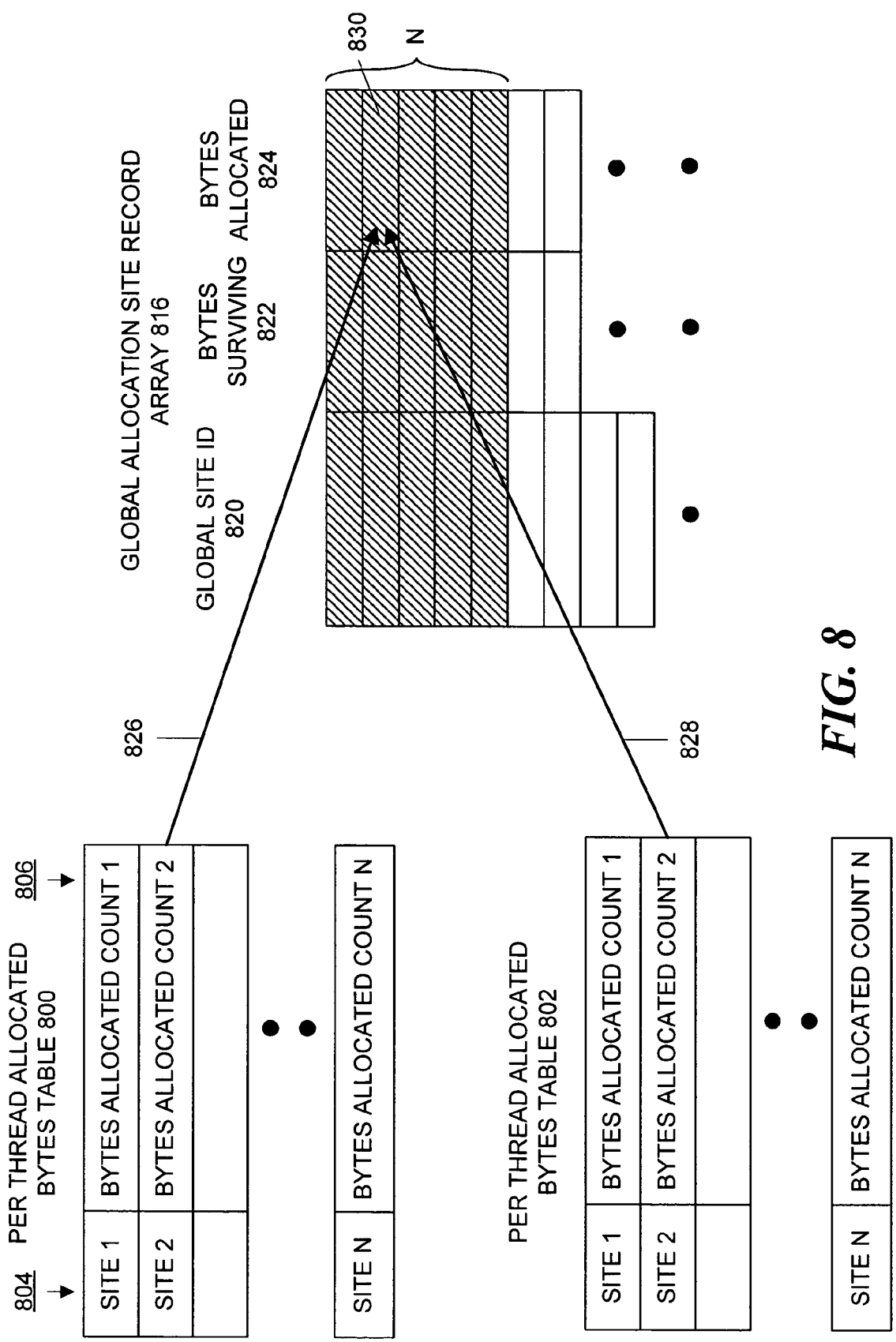
FIG. 8 is a block schematic diagram illustrating the use of thread-local arrays to eliminate atomic operations and locks in updating bytes allocated counts for allocation sites.

In accordance with the principles of the invention, a modified matrix approach takes advantage of the fact that byte allocations are being counted for only a small number of candidate sites (the number of byte allocation counting sites is bound, for example, by N, the total number of sites in the "Candidate" state at any given time). Specifically, an N-entry array of allocated byte counts is provided for each application thread as shown in FIG. 8 which illustrates the arrays 800 and 802 for two threads. For example, the array may be contained in a structure representing the application thread. Each array is indexed by a site number 804 and contains a bytes allocated count 806 for that site and each array is bounded by the total number of sites in the "Candidate" state which is assumed to be "N" in this example. In addition, since each array is local to the thread that contains it, each thread can write into its array without using atomic operations or locks.

Figure 9:
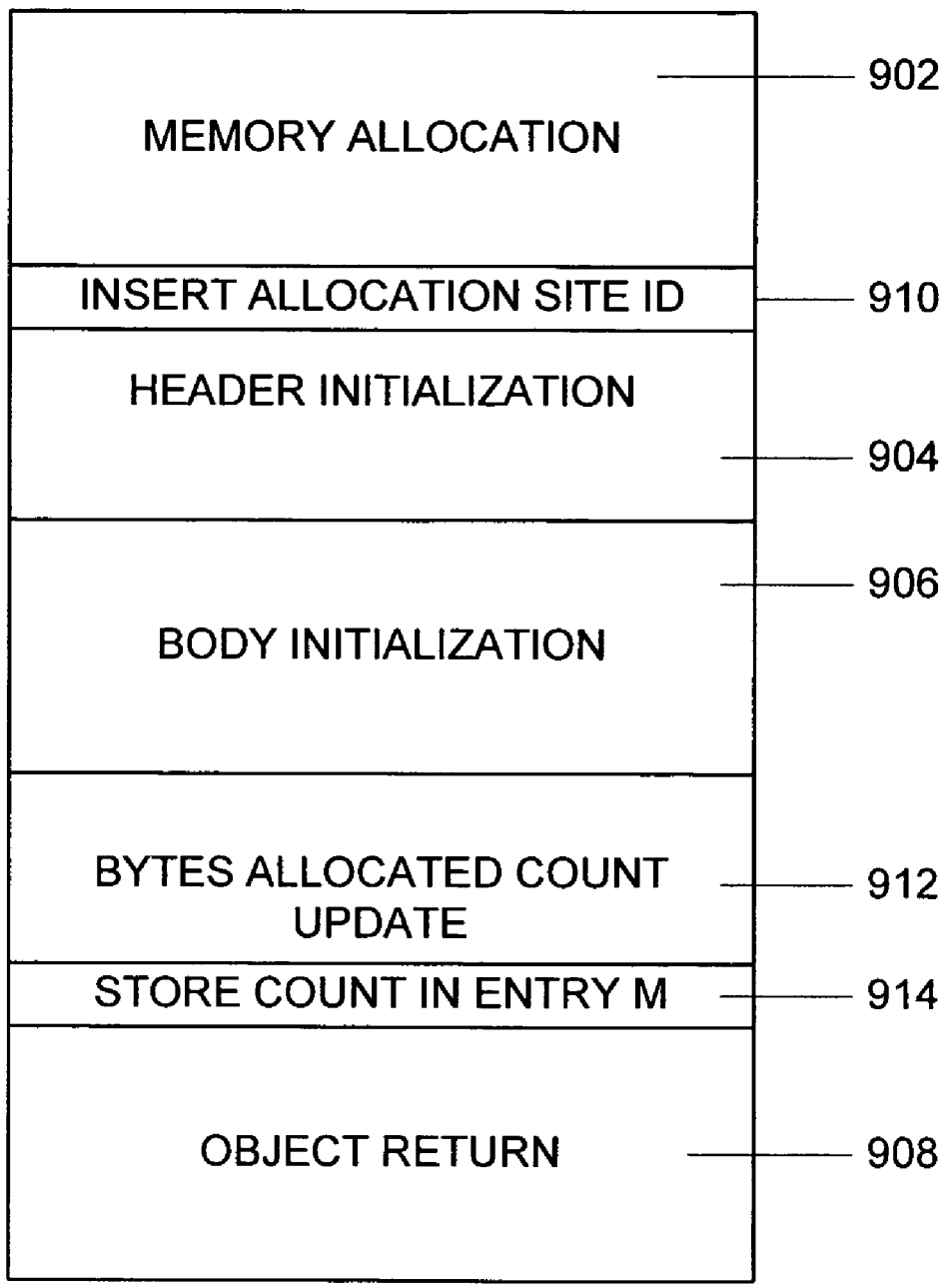
FIG. 9 is a block schematic diagram illustrating modifications that are made to object allocation code to count bytes allocated at a particular allocation site by a thread in a multi-threaded system.

Then, during compilation, the allocated byte counting code is generated in a manner that it updates one of the array entries. In particular, the allocated byte counting code can be generated so that it can be easily modified to update any of the N entries, for example, by altering immediate operands in one or more instructions. When an allocation site is placed in the "Candidate" state, it is assigned one of these N candidate site identifiers, and its allocation code is altered to update the appropriate thread-local count. This alteration is illustrated in FIG. 9 which shows in schematic form the byte allocation counting code 900. This code is similar to that illustrated in FIG. 3B and comprises memory allocation code 902, header initialization code 904, body initialization code 906 and object return code 908. As illustrated in FIG. 3B, the header initialization code 904 has been modified to add code that inserts the allocation site ID into the object header as indicated at 910. Further, the body initialization code is modified to insert the bytes allocated count update code 912. Code 912 is further modified to store the resulting bytes allocated count in entry M that has been assigned to that allocation site. A similar modification can be made to the bytes allocated counting stub code shown in FIG. 3A.

Then, during the next collection cycle, the thread-local bytes allocated counts are summed, and the allocated byte counts are attributed to the corresponding allocation sites. This is illustrated schematically by arrows 826 and 828, which indicate that the bytes allocated count for allocation site 2 are summed to update the bytes allocated count 824 for site 830 in the global allocation site record array 816.

Many variations on the aforementioned process are possible. For example, since the inventive process samples every object allocation at an allocation site for a short period of time, it might be affected by certain behaviors where the allocation behavior of the application program changes over medium-range time granularities. If such a change causes a site in the "Normal" state to become a site in the "Candidate" state, the process is not affected. In another embodiment, the bytes allocated count that caused a site to be placed in the "Held Back" state is stored. If the survival rate of that site later increases, the number of surviving bytes for that site might become larger. If the number is sufficiently large, the state of the site in the "Held Back" state to the "Candidate" state as schematically indicated by dotted arrow 720 in FIG. 7.

Other situations are more difficult to detect. For example, such a situation might arise with a site whose allocated byte survival rate was high when it was sampled, and it was therefore placed in a "Pre-tenured" state. If the allocated byte survival rate later becomes lower, the state of that site might best be modified to "Normal" in order to allocate objects in the young generation. There are several approaches that can be taken to detect such allocation sites. Another embodiment reverses pre-tenuring decisions at regular intervals, changing the state of sites in the "Pre-tenured" state back to the "Normal" state as indicated by dotted arrow 724 in FIG. 7 (or perhaps directly to the "Candidate" state, as indicated by dotted arrow 722.) If the behavior of one of these sites still justifies pre-tenuring, it will quickly be re-identified. In this embodiment, it may be best to revert only a small number (perhaps one) of the sites in a "Pre-tenured" state at a time.

Other embodiments with more directed approaches assume that it is possible to distinguish between pre-tenured allocation and normal promotion allocation in the old generation. If these two types of promotion can be distinguished, in one embodiment when the old-generation occupancy that will cause the old generation to be collected is approached, allocation counting for some set of pre-tenured allocation sites could be re-enabled. After old generation "liveness" is determined, the surviving bytes are counted for each allocation site that is being sampling, in order to obtain a survival rate estimate. If this estimate is less than the pre-tenuring threshold, then the site is reverted from "Pre-tenured" to "Normal." (For this to meaningfully predict survival rates if pre-tenuring of the allocation site were reverted, the amount of counted allocation should be similar to the young generation size.)

One further embodiment also counts surviving objects by allocation in a young-generation-sized area of the old-generation that is being filled by allocation from pre-tenured objects. Instead of enabling counting when this area is filled however, this embodiment estimates the expected bytes surviving from the allocation and survival rates computed when the site was in a "Candidate" state and reverses the pre-tenuring decision if the actual amount surviving for a site is sufficiently smaller than the estimate.

A software implementation of the above-described embodiment may comprise a series of computer instructions fixed on a tangible medium, such as a computer readable media, for example, a diskette, a CD-ROM, a ROM memory, or a fixed disk. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices. It is contemplated that such a computer program product may be distributed as a removable media with accompanying printed or electronic documentation, e.g., shrink wrapped software, preloaded with a computer system, e.g., on a system ROM or fixed disk, or distributed from a server or electronic bulletin board over a network, e.g., the Internet or World Wide Web.

Although an exemplary embodiment of the invention has been disclosed, it will be apparent to those skilled in the art that various changes and modifications can be made which will achieve some of the advantages of the invention without departing from the spirit and scope of the invention. For example, it will be obvious to those reasonably skilled in the art that, in other implementations, different criteria may be used to make the pre-tenuring decisions. In addition, instead of selecting a fixed, predetermined number of allocation sites with the highest number of surviving bytes as candidate sites, some sites may be eliminated from the list of potential candidate sites if the number of their surviving bytes is below some predefined threshold. This reduces the number of sites that must be monitored and thereby reduces overhead. The order of the process steps may also be changed without affecting the operation of the invention. Other aspects, such as the specific process flow, as well as other modifications to the inventive concept are intended to be covered by the appended claims.

What is claimed is:

1. A method for dynamically pre-tenuring new object memory allocation in a generational garbage collector, comprising:
   initiating a memory collection of a first young generation;
   determining the number of bytes allocated at a plurality of allocation sites that survive collection;
   selecting a plurality of candidate sites with the highest number of bytes that survive collection from the plurality of allocation sites;
   completing the memory collection of the first young generation;
   initiating a memory collection of a second young generation after the completion of the memory collection of the first young generation;
   determining, for each of the plurality of candidate sites, a survival rate of allocated bytes that survive memory collection; and
   storing to an older generation in a memory heap a plurality of objects from the plurality of candidate sites with survival rates greater than a predetermined threshold.

2. The method of claim 1, further comprising:
   counting bytes allocated for each of the plurality of candidate sites before determining survival rates.

3. The method of claim 2, wherein counting allocated bytes is performed by means generated at compile time.

4. The method of claim 2, wherein counting allocated bytes initiates after the plurality of candidate sites are selected.

5. The method of claim 2, further comprising:
   terminating counting allocated bytes for one of the plurality of candidate sites when the survival rate for that candidate site is greater than a predetermined threshold.

6. The method of claim 1, further comprising:
   inserting an identifier for one of the plurality of allocation sites into a header of one of the plurality of objects allocated from that allocation site;
   using identifiers in headers of the plurality of objects that survive collection to determine a plurality of allocation sites from which those objects were allocated; and
   adding the number of bytes in one of the plurality of surviving objects to a count for one of the plurality of allocation sites that allocated that surviving object.

7. The method of claim 6, wherein the counts are sorted by value and a predetermined number of the plurality of allocation sites are selected with the highest count values.

8. The method of claim 1, further comprising:
   placing one of the plurality of candidate sites with survival rate less than the predetermined threshold in a held back state; and
   removing the site from the plurality of candidate sites.

9. The method of claim 8, further comprising:
   terminating counting allocated bytes for one of the plurality of candidate sites when the site is placed in a held back state.

10. The method of claim 8, further comprising:
    placing one of the plurality of sites that is in a held back state into a state that is considered for selection as a candidate site after a predetermined interval.

11. The method of claim 10, wherein the predetermined interval is the time interval during which a predetermined number of young generation collections occur after one of the plurality of sites is placed in the held back state.

12. The method of claim 8, further comprising:
    storing a survival rate of one of the plurality of sites that is placed in a held back state;
    monitoring surviving bytes of the site that is placed in the held back state;
    when the surviving bytes for the monitored site exceeds a threshold, as determined by the stored survival rate, placing that site in a state that is considered for selection as a candidate site.

13. The method of claim 1, further comprising:
    placing sites with survival rates greater than a predetermined threshold in a pre-tenured state in which all objects allocated from those sites will be stored to an older generation in the memory heap.

14. The method of claim 13, further comprising:
    periodically changing the state of sites in pre-tenured states so that those sites will be considered as candidate sites.

15. The method of claim 13, further comprising:
    for at least one site in a pre-tenured state when occupancy of the older generation approaches a level that will cause the older generation to be collected, estimating a survival rate of bytes allocated at that site that survive collection and changing the state of that site so that site will be considered a candidate site when the estimated survival rate is less than the predetermined threshold.

16. The method of claim 13, further comprising:
storing the survival rate as a first survival rate;
determining a second survival rate of objects in a young generation sized area of the older generation that is being filled by objects allocated from sites in a pre-tenured state;
when the young generation sized area becomes filled, comparing the first survival rate with the second survival rate; and
placing sites in a pre-tenured state in a state in which they are considered as candidates when the second survival rate is smaller than the first survival rate by a predetermined amount.

17. An apparatus for dynamically pre-tenuring new object memory allocation in a generational garbage collector, comprising:
a memory;
a surviving byte counting mechanism resident in memory and operable during a first young generation collection for a plurality of allocation sites, that determines the number of bytes allocated at each of the plurality of allocation sites that survive collection;
a candidate selection mechanism resident in memory that selects a plurality of candidate sites from a plurality of allocation sites with the highest number of bytes that survive collection as determined by the surviving byte counting mechanism;
a survival rate mechanism, resident in memory and operable during a second young generation collection occurring after the first young generation collection, that determines, for each of the plurality of candidate sites, a survival rate of bytes allocated that survive collection; and
an allocation mechanism resident in memory that stores to an older generation in a memory heap a plurality of objects from the plurality of candidate sites with survival rates as determined by the survival rate mechanism greater than a predetermined threshold.

18. The apparatus of claim 17, wherein the survival rate mechanism comprises:
a counting mechanism, resident in memory, that counts the bytes allocated by each of the plurality of candidate sites between young generation collections; and
a mechanism, resident in memory, that uses the number of bytes that survive to determine the survival rate.

19. The apparatus of claim 18, wherein the counting mechanism is generated at compile time.

20. The apparatus of claim 19, further comprising:
a mechanism, resident in memory, that ends counting allocated bytes for one of the plurality of candidate sites when the survival rate for the site as determined by the survival rate mechanism is greater than a predetermined threshold.

21. The apparatus of claim 18, wherein the counting mechanism further comprises a mechanism, resident in memory, that ends counting allocated bytes for one of the plurality of candidate sites at compile time and recommences counting allocated bytes when one of the plurality of allocation sites is selected as a candidate site by the candidate selection mechanism.

22. The apparatus of claim 17, wherein the surviving byte counting mechanism comprises:

a mechanism, resident in memory, that inserts an identifier for one of the plurality of allocation sites into a header of one of a plurality of objects that is allocated from that allocation site;
a mechanism, resident in memory, that uses identifiers in headers of the plurality of objects that survive collection to determine a plurality of allocation sites from which the plurality of objects was allocated; and
an adding mechanism, resident in memory, that adds the number of bytes for each of the plurality of surviving objects to a count for each of the plurality of allocation sites that allocated those surviving objects.

23. The apparatus of claim 22, wherein the survival rate mechanism comprises a mechanism, resident in memory, that sorts the counts accumulated by the adding mechanism by value and selects a predetermined number of sites with the highest count values.

24. The apparatus of claim 17, further comprising:
a mechanism, resident in memory, that places sites with survival rates, as determined by the survival rate mechanism, less than the predetermined threshold in a held back state where they are not selected as candidate sites by the candidate selection mechanism.

25. The apparatus of claim 24, further comprising:
a mechanism, resident in memory, that ends counting allocated bytes for one of the plurality of candidate sites when the candidate site is placed in a held back state.

26. The apparatus of claim 24, further comprising:
a mechanism, resident in memory, that places one of the plurality of sites in a held back state into a state that is considered for selection as a candidate site by the candidate selection mechanism after a predetermined interval.

27. The apparatus of claim 26, wherein the predetermined interval is the time interval during which a predetermined number of young generation collections occur after the site is placed in the held back state.

28. The apparatus of claim 24, further comprising:
a mechanism, resident in memory, that stores a survival rate of a site that is placed in a held back state;
a mechanism, resident in memory, that monitors surviving bytes of the site that is placed in the held back state;
a mechanism, resident in memory and operable when the surviving bytes for the monitored site exceeds a threshold determined from the stored survival rate, that places that site in a state that is considered for selection as a candidate site by the candidate selection mechanism.

29. The apparatus of claim 17, wherein the allocation mechanism comprises placing sites with survival rates as determined by the survival rate mechanism greater than a predetermined threshold in a pre-tenured state in which all objects allocated from those sites will be stored to an older generation in the memory heap without performing further processing.

30. The apparatus of claim 29, further comprising:
periodically changing the state of sites in a pre-tenured state to be considered as candidate sites by the candidate selection mechanism.

31. The apparatus of claim 29, further comprising:
a mechanism, resident in memory and operable when occupancy of the older generation approaches a level that will cause the older generation to be collected, that causes the survival rate mechanism to determine, for at least one site in a pre-tenured state, the survival rate of bytes allocated at that site that survive collection; and that changes the state of that site so that site will be considered as a candidate site by the candidate selection mechanism when the determined survival rate is less than the predetermined threshold.

32. The apparatus of claim 29, further comprising:
a rate storage mechanism, resident in memory, that stores the survival rate used by the survival rate mechanism;
a second survival rate mechanism, resident in memory, that determines the survival rate of a plurality of objects in a young generation sized area of the older generation that is being filled by a plurality of objects allocated from sites in a pre-tenured state;
a mechanism, resident in memory and operable when the young generation sized area becomes filled, that compares the survival rate stored by the rate storage mechanism with the survival rate determined by the second survival rate mechanism; and
a mechanism, resident in memory, that places a plurality of sites in a pre-tenured state in a state in which they are considered as candidates by the candidate selection mechanism when the survival rate determined by the second survival rate mechanism is smaller than the survival rate stored by the rate storage mechanism by a predetermined amount.

33. An apparatus for dynamically pre-tenuring new object memory allocation in a generational garbage collector, comprising: a memory heap;
surviving bytes counting means, operable during a first young generation collection and for each of a plurality of allocation sites, for determining the number of bytes allocated at each of the plurality of allocation sites that survive collection;
candidate selecting means for selecting as candidate sites a plurality of allocation sites with the highest number of bytes that survive collection;
survival rate means, operable during a second young generation collection occurring after the first young generation collection, for determining, for each of a plurality of candidate sites, a survival rate of bytes allocated at each of a plurality of candidate sites that survive collection; and
means for storing to an older generation in the memory heap a plurality of objects from a plurality of sites with survival rates as determined by the survival rate means greater than a predetermined threshold.

34. The apparatus of claim 33, wherein the survival rate means comprises:
byte counting means for counting the bytes allocated by each of the plurality of candidate sites between young generation collections; and
means for using the number of bytes that survive to determine the survival rate.

35. The apparatus of claim 34, wherein the byte counting means comprises:
means for counting allocated bytes generated at compile time.

36. The apparatus of claim 35, further comprising:
terminating counting allocated bytes for one of the plurality of candidate sites when the survival rate for that site as determined by the survival rate means is greater than a predetermined threshold.

37. The apparatus of claim 35, further comprising:
means for terminating counting allocated bytes for one of the plurality of candidate sites when that site is placed in a held back state.

38. The apparatus of claim 34, wherein the byte counting means further comprises:
means for counting allocated bytes initiated after the plurality of candidate sites are selected.

39. A computer readable medium having computer readable program code stored thereon to dynamically pre-tenure new object memory allocation in a generational garbage collector having instructions comprising functionality to:
initiate a memory collection of a first young generation;
determine the number of bytes allocated at a plurality of allocation sites that survive collection;
select a plurality of candidate sites with the highest number of bytes that survive collection from the plurality of allocation sites;
complete the memory collection of the first young generation;
initiate a memory collection of a second young generation after the completion of the memory collection of the first young generation;
determine, for each of the plurality of candidate sites, a survival rate of allocated bytes that survive memory collection; and
store to an older generation in a memory heap a plurality of objects from the plurality of candidates sites with survival rates greater than a predetermined threshold.

\* \* \* \* \*